United States Patent [19]
Goff et al.

[11] Patent Number: 5,845,130
[45] Date of Patent: Dec. 1, 1998

[54] MAILBOX TRAFFIC CONTROLLER

[75] Inventors: Lonnie C. Goff, Tempe; Peter Chambers, Scottsdale, both of Ariz.

[73] Assignee: VLSI Technology, Inc., San Jose, Calif.

[21] Appl. No.: 712,089

[22] Filed: Sep. 11, 1996

[51] Int. Cl.[6] .............................. G06F 12/02; G06F 13/16
[52] U.S. Cl. .......................... 395/728; 711/149; 711/150
[58] Field of Search ..................................... 395/821, 848, 395/728, 729, 732, 293, 289, 299, 303; 711/147, 150, 151, 152

[56] References Cited

U.S. PATENT DOCUMENTS

| | | | |
|---|---|---|---|
| 4,354,227 | 10/1982 | Hays, Jr. et al. | 364/200 |
| 4,608,631 | 8/1986 | Stiffler et al. | 364/200 |
| 4,698,753 | 10/1987 | Hubbins et al. | 711/150 |
| 4,764,865 | 8/1988 | Temple, III | 711/150 |
| 4,937,781 | 6/1990 | Lee et al. | 711/149 |
| 5,047,921 | 9/1991 | Kinter et al. | 364/200 |
| 5,276,842 | 1/1994 | Sugita | 711/149 |
| 5,450,566 | 9/1995 | Yoshida et al. | 711/150 |
| 5,490,253 | 2/1996 | Laha et al. | 395/304 |
| 5,511,179 | 4/1996 | Chai-I | 711/149 |
| 5,524,255 | 6/1996 | Beard et al. | 395/800 |
| 5,526,487 | 6/1996 | Schiffleger | 395/821 |
| 5,590,299 | 12/1996 | Bennett | 711/5 |
| 5,625,824 | 4/1997 | Melo et al. | 711/106 |
| 5,656,784 | 8/1997 | Inaba et al. | 495/726 |
| 5,666,515 | 9/1997 | White et al. | 711/150 |
| 5,669,002 | 9/1997 | Buch | 711/150 |

*Primary Examiner*—Joseph E. Palys
*Attorney, Agent, or Firm*—Wagner,Murabito&Hao

[57] ABSTRACT

A system and method for preventing contention in a shared memory environment. In one embodiment, a first processor reads a traffic controller which is coupled to a shared memory and to a second processor. The first processor writes its identifier into the traffic controller provided that the traffic controller does not already have an identifier corresponding to the second processor stored therein. If the traffic controller does have an identifier corresponding to the second processor stored therein, the first processor periodically reads the traffic controller until the traffic controller does not have an identifier corresponding to the second processor stored therein. Once the traffic controller has the identifier corresponding to the first processor stored therein, the traffic controller allows the first processor to control access to the shared memory. Once the first processor controls access to the shared memory, the second processor knows that it must wait before attempting to control access to the shared memory. In so doing, the present invention eliminates contention between the first and second processors for control of the shared memory.

15 Claims, 6 Drawing Sheets

MAILBOX TRAFFIC CONTROLLER

TECHNICAL FIELD

The present claimed invention relates to the field of multiple processor interfacing. More specifically, the present claimed invention relates to sharing a memory between two processors.

BACKGROUND ART

In prior art information exchange schemes, one processor attempts to share information with another processor via a memory which is coupled to both of the processors. A schematic diagram of a conventional shared memory configuration for interfacing two processors is shown in Prior Art FIG. 1. As illustrated in Prior Art FIG. 1, a first processor, processor A, is coupled to a shared memory 12. Similarly, a second processor, processor B, is also coupled to shared memory 12. In such a prior art configuration, a first processor can place information into the memory and then prompt a second processor to retrieve the information. In so doing, it is possible for the two processors to pass data to and communicate with each other. Unfortunately, such a prior art processor interfacing scheme has several substantial drawbacks associated therewith.

First, contention between the first and second processors for access to the shared memory space can result in data being overwritten and lost. More specifically, if the first processor and the second processor are simultaneously accessing the shared memory space, the first processor can write data to the same location to which the second processor just wrote data. As a result, the second processor believes that specific data has been stored at a particular address in the shared memory, but, actually, the first processor's data now resides in that particular address of the shared memory. Hence, the data originally written to the shared memory by the second processor is lost, that is, overwritten. In such an example, valuable data is wasted. Furthermore, if the second processor then requests the first processor to retrieve the information which the second processor intended to store at a specific location, the first processor will not receive the intended data.

As yet another drawback, the result of contention between two processors for the same shared memory space is indeterminate. That is, the memory space may contain data from either the first processor or the second processor. Thus, there is no simple method to determine which processor was able to store its data, and which processor's data was lost or overwritten.

Thus, a need exists for a system which eliminates contention for memory shared between two processors. A further need exists for a system which allows either of two processors to control access to shared memory at a given time. Yet another need exists for a system which achieves the above needs without requiring a complex operating system to control access of the two processors to the shared memory.

DISCLOSURE OF THE INVENTION

The present invention provides a system which eliminates contention for memory shared between two processors; a system which allows either of two processors to control access to shared memory at a given time; and a system which achieves the above needs without requiring a complex operating system to control access of the two processors to the shared memory. The present invention accomplishes the above achievements with a traffic controller for dynamically controlling access to shared memory or "mailbox".

Specifically, in one embodiment, a first processor reads a traffic controller which is coupled to a shared memory and to a second processor. A task operating in the first processor writes the first processor's identifier into the traffic controller provided that the traffic controller does not already have an identifier corresponding to the second processor stored therein. If the traffic controller does have an identifier corresponding to the second processor stored therein, the first processor periodically reads the traffic controller until the traffic controller does not have an identifier corresponding to the second processor stored therein. Once the traffic controller has the identifier corresponding to the first processor stored therein, the traffic controller allows the requesting task operating in the first processor to control access to the shared memory. Once the first processor controls access to the shared memory, the second processor knows that it must wait before attempting to control access to the shared memory. In so doing, the present invention eliminates contention between the first and second processors for control of the shared memory.

The present invention also discloses an apparatus for performing the above described method in a peripheral component interconnect (PCI) environment. Specifically, the present invention discloses a first processor coupled to a PCI bus, and a shared memory coupled to the PCI bus. The present invention further includes a second processor coupled to the shared memory. In the present invention, a traffic controller is coupled to the first processor and the second processor. The traffic controller is adapted to indicate to the first and second processors when one of the first and second processors is controlling access to the shared memory such that the other of the first and second processors waits to attempt to control access to the shared memory thereby preventing contention between the first and second processors for control of the shared memory.

It should be noted that the present invention is not a locking mechanism. There is nothing in this scheme which precludes either processor, at any time, from accessing the dual ported register array. Just as a traffic light does not act as a barrier to multiple sources of traffic, the mailbox traffic controller does not block mailbox usage. The advantage to this scheme is twofold. First, many operations which cause information to be transferred between two processors consist of bidirectional data transfers. For instance, task 1 in processor 1, after getting the green light from the traffic controller, might load some variety of a read command into the register array. Processor 2, after decoding the read command, is free to return the requested data without the necessity of first waiting for processor 1 to relinquish mailbox ownership and then obtaining its own access rights. Throughout the entire read operation, task 1 in processor 1 "owns" the green light. Other tasks attempting to use the mailbox are given the red light by the traffic controller. Second, if a task does not behave properly (e.g. a software bug) and forgets to relinquish its green light, then the mailbox data path will not be rendered unusable. Instead, the traffic controller could be reset by a supervisor routine monitoring mailbox inactivity.

These and other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
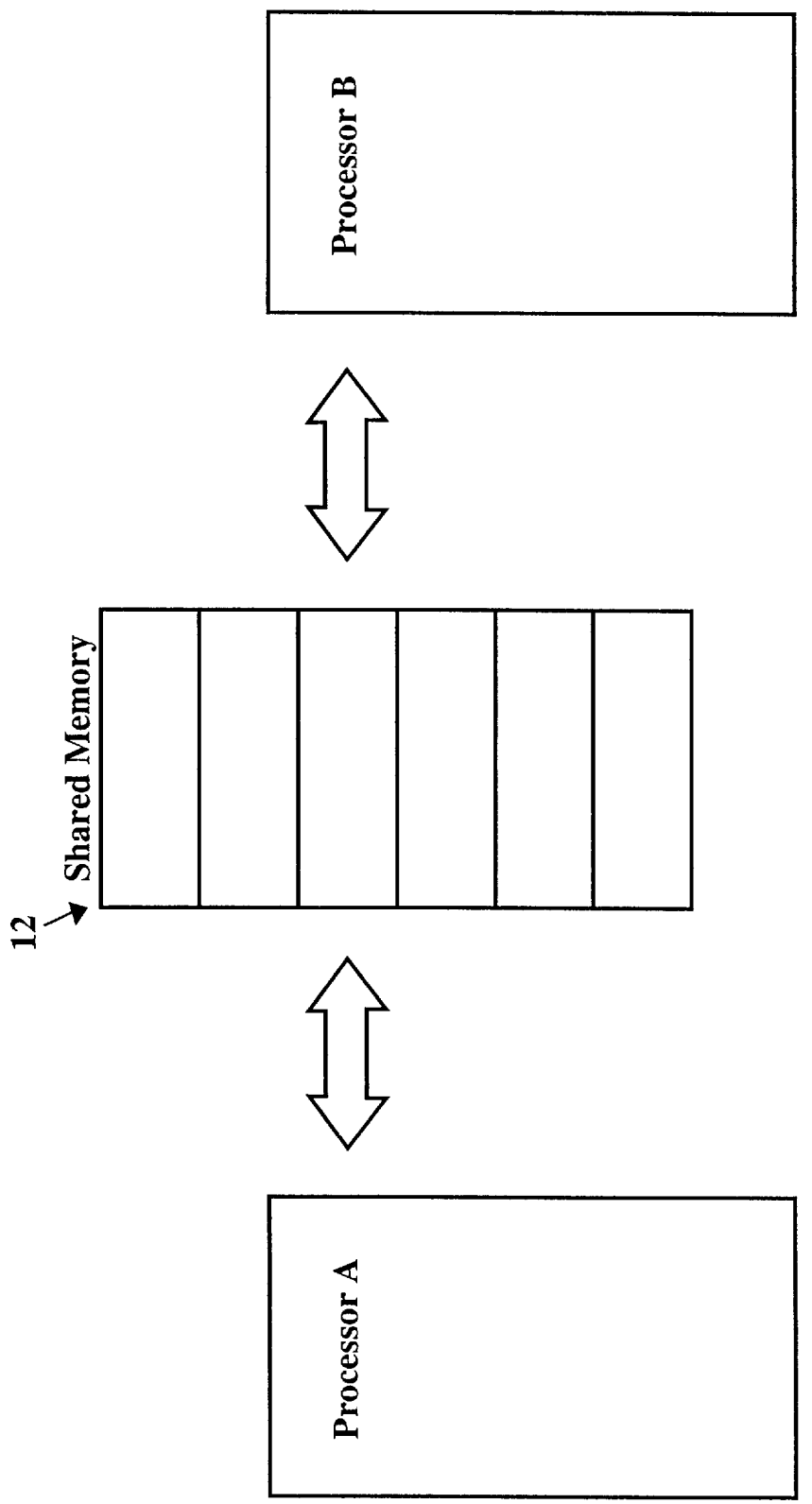
FIG. 1 is a schematic diagram of a conventional shared memory configuration for interfacing two processors.
Figure 2:
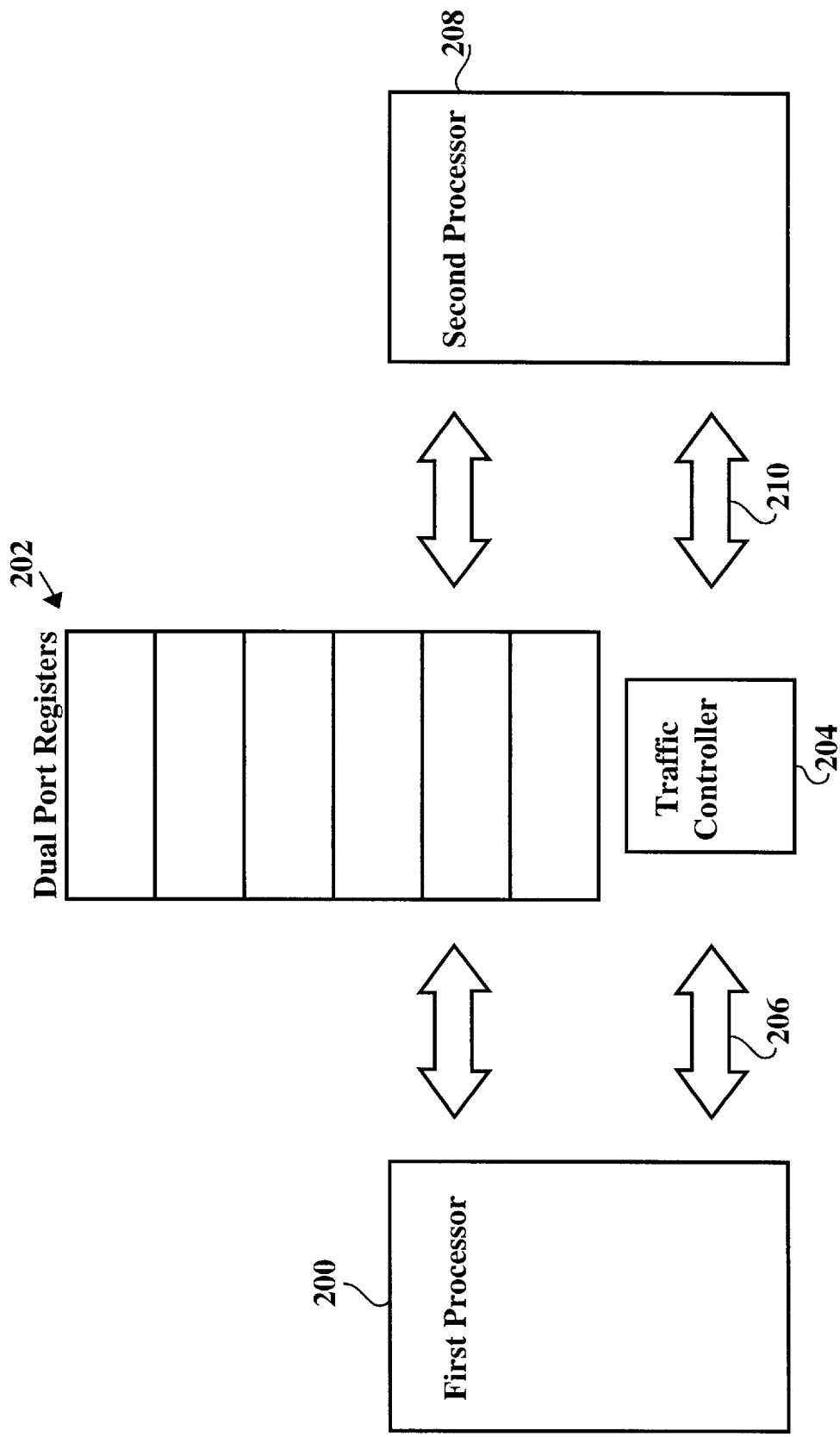
FIG. 2 is a schematic diagram illustrating components of a memory contention elimination apparatus in accordance with one embodiment of the present claimed invention.

With reference now to FIG. 2, a first processor 200 is coupled to a shared memory 202. In the present embodiment, the "mailbox" or shared memory 202 is comprised of dual ported registers. More specifically, in the present embodiment, shared memory 202 is comprised of an array of dual ported, eight bit, read/write registers. It will be understood, however, that the present invention is also well suited to using various other types of memory configurations as the shared memory. First processor 200 is also coupled to a traffic controller 204 via read/write path 206. Similarly, second processor 208 is also coupled to shared memory 202. Second processor 208 is also coupled to traffic controller 204 via read write path 210. Thus, both first processor 200 and second processor 208 are able to access shared memory 202, and both first processor 200 and second processor 208 are able to read from and write into traffic controller 204.

Figure 3:
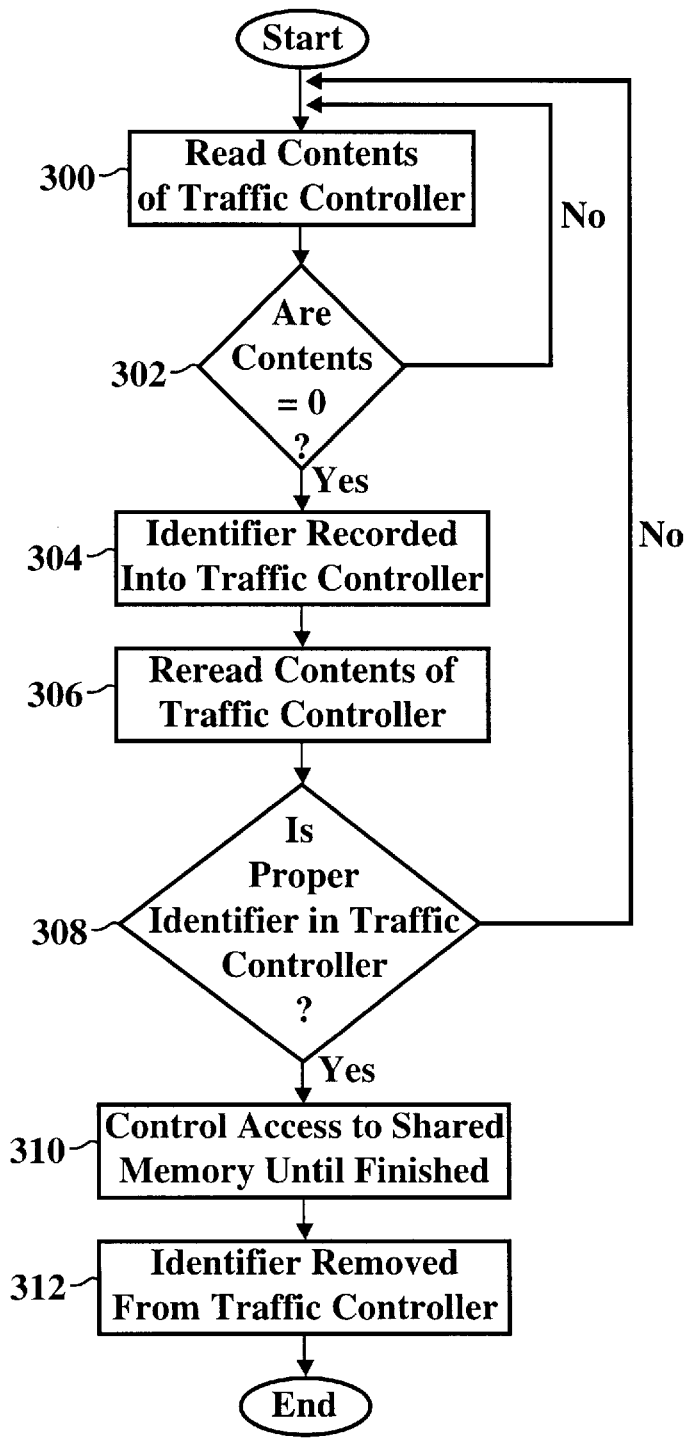
FIG. 3 is a flow chart illustrating steps performed by the components of FIG. 2 in accordance with one embodiment of the present claimed invention.

Referring now to FIG. 3, a flow chart of steps performed by the components of FIG. 2 in accordance with the present invention is shown. As shown in step 300 of FIG. 3, in the present embodiment, when a task operating in first processor 200 desires access to shared memory 202, the requesting task operating in the first processor 200 reads the contents of traffic controller 204.

As shown in decision step 302 of FIG. 3, the present invention then determines whether the contents of the traffic controller are equal to zero. That is, the requesting task of first processor 200 checks to see if an identifier corresponding to the second processor is already present in traffic controller 204. In the present embodiment, a zero stored in traffic controller 204 indicates that no processor currently controls access to shared memory 202. It will be understood that the present invention is also well suited to having various other values stored in traffic controller 204 to indicate that neither of processors 200 and 208 is currently controlling access to traffic controller 204. If traffic controller 204 does have an identifier corresponding to second processor 208 stored therein, the requesting task of first processor 200 periodically repeats steps 300 and 302 until traffic controller 204 does not have an identifier corresponding to second processor 208 stored therein. If no identifier is located in traffic controller 204, the present invention proceeds to step 304 as shown.

In step 304, traffic controller 203 records the identifier of first processor 200 therein. In the present embodiment, the identifier identifies the processor writing into traffic controller 204. For example, if first processor 200 is an Intel X86-type of processor available from Intel Corporation of Santa Clara, Calif., traffic controller 204 writes a value of 86 hexadecimal pertaining to processor 200 into traffic controller 204. The present invention is also well suited to using various other values for the respective identifiers corresponding to each of processors 200 and 208. If a task of second processor 208 desires to control access to shared memory 202 and when reading traffic controller 204 finds the identifier of first processor 200 stored therein, second processor 208 knows that it must wait before attempting to control access to shared memory 202.

Referring now to step 306 of FIG. 3, after having its identifier written into traffic controller 204, first processor 200 re-reads the contents of traffic controller 204 to insure that the proper identifier is stored therein. That is, first processor 200 re-reads traffic controller 204 to insure that the identifier of the second processor 208 has not been written into traffic controller 204 between when the requesting task of first processor 200 first found a zero in traffic controller 204 and when the identifier of first processor 200 was written into traffic controller 204.

As shown in decision step 308 of FIG. 3, the present invention then determines whether the proper identifier is stored in traffic controller 304. If traffic controller 204 does not have the proper identifier corresponding to first processor 200 stored therein, but, instead, has an identifier corresponding to second processor 208 stored therein, steps 300 through 308 are periodically repeated until traffic controller 204 has an identifier corresponding to first processor 200 stored therein. If the identifier corresponding to first processor 200 is located in traffic controller 204, the present invention proceeds to step 310 as shown.

As indicated in step 310, once traffic controller 204 has the identifier corresponding to first processor 200 stored therein, traffic controller 204 allows the requesting task of first processor 200 to control access to shared memory 202. Although the requesting task of first processor 200 controls access to shared memory 202, second processor 208 may be allowed to access shared memory 202. For example, first processor 200 can place into shared memory 204 an instruction or query command to which second processor 208 is requested to respond. Second processor 208 then writes its response into shared memory 202 as directed by first processor 200. Thus, even though the requesting task of first processor 200 currently controls access to shared memory 202, second processor 208 is able to access shared memory 202 when so directed by first processor 200. Therefore, traffic controller 204 of the present invention does not physically lock shared memory 202, but instead functions as a traffic light, selectively allowing one of processors 200 and 208 to control access to shared memory 202. It will be understood that second processor 208 can alternately control access to shared memory 202 in the same manner as described above for first processor 200. Thus, the present invention allows tasks of either of two processors to control access to shared memory at a given time. As a result, the present invention provides contention free, bi-directional access to shared memory 202. As shown in step 310, first processor 200 controls access to shared memory 202 until first processor 200 no longer desires to control access to shared memory 202.

Referring now to step 312 of FIG. 3, once the requesting task of first processor 200 is finished controlling access to traffic controller 204, first processor 200 removes its identifier from traffic controller 204. In the present embodiment, a zero is stored into traffic controller 204 to indicate that neither processor currently controls access to the shared memory. As mentioned above, a zero value indicates that no processor currently controls access to shared memory 202. Again, it will be understood that the present invention is also well suited to having various other values into traffic controller 204 to clear the identifier of first processor 200 therefrom and indicate that neither first processor 200 nor second processor 208 is currently controlling access to traffic controller 204.

Figure 4:
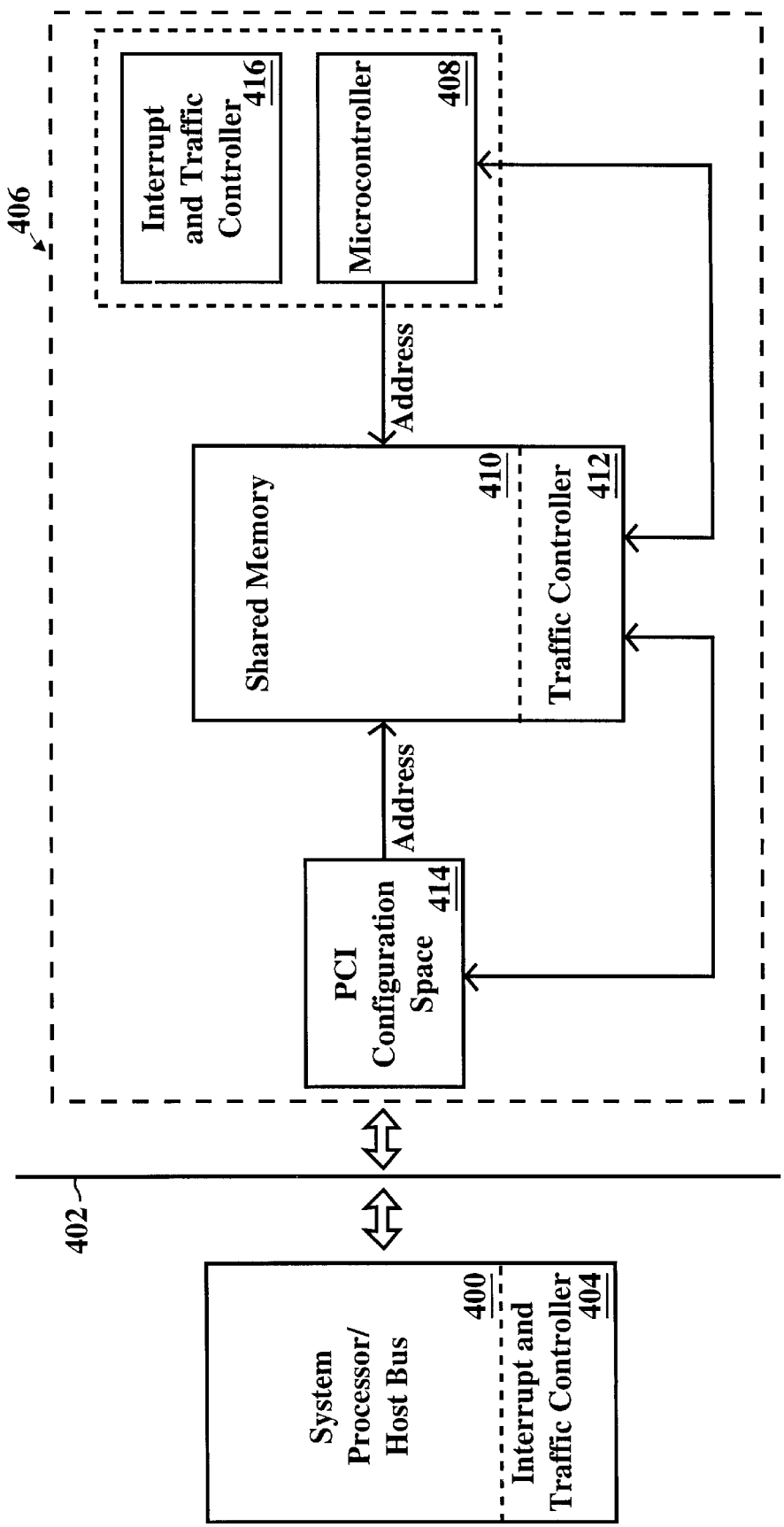
FIG. 4 is a schematic diagram of the architecture of one embodiment of the present invention.

With reference next to FIG. 4, a schematic diagram of the architecture of one embodiment of the present invention is shown. In the present embodiment, a system processor 400 is coupled via a host bus to a peripheral component interconnect (PCI) bus 402. System processor 400 also contains an interrupt and traffic controller management system 404. In the embodiment of FIG. 4, a peripheral component 406 is also coupled to PCI bus 402. Peripheral component 406 includes a microcontroller 408, shared memory 410, a traffic controller 412, and PCI configuration space 414. Additionally, in the present invention, traffic controller 412 comprised of a dual ported, read/write register array which is contiguous with shared memory 410. As indicated in FIG. 4, the processor of microcontroller 408 includes an interrupt and traffic controller management system 416 contained therein. In the present embodiment, the present invention allows both system processor 400 and the processor of microcontroller 408 to access shared memory 410 without contention. Thus, the present embodiment allows pairs of processors residing within peripheral components to access a respective shared memory. Although only a single pair of processors is shown accessing a respective shared memory in FIG. 4, it will be understood that the present invention is well suited for use in an environment where multiple pairs of processors access multiple respective shared memories.

Figure 5:
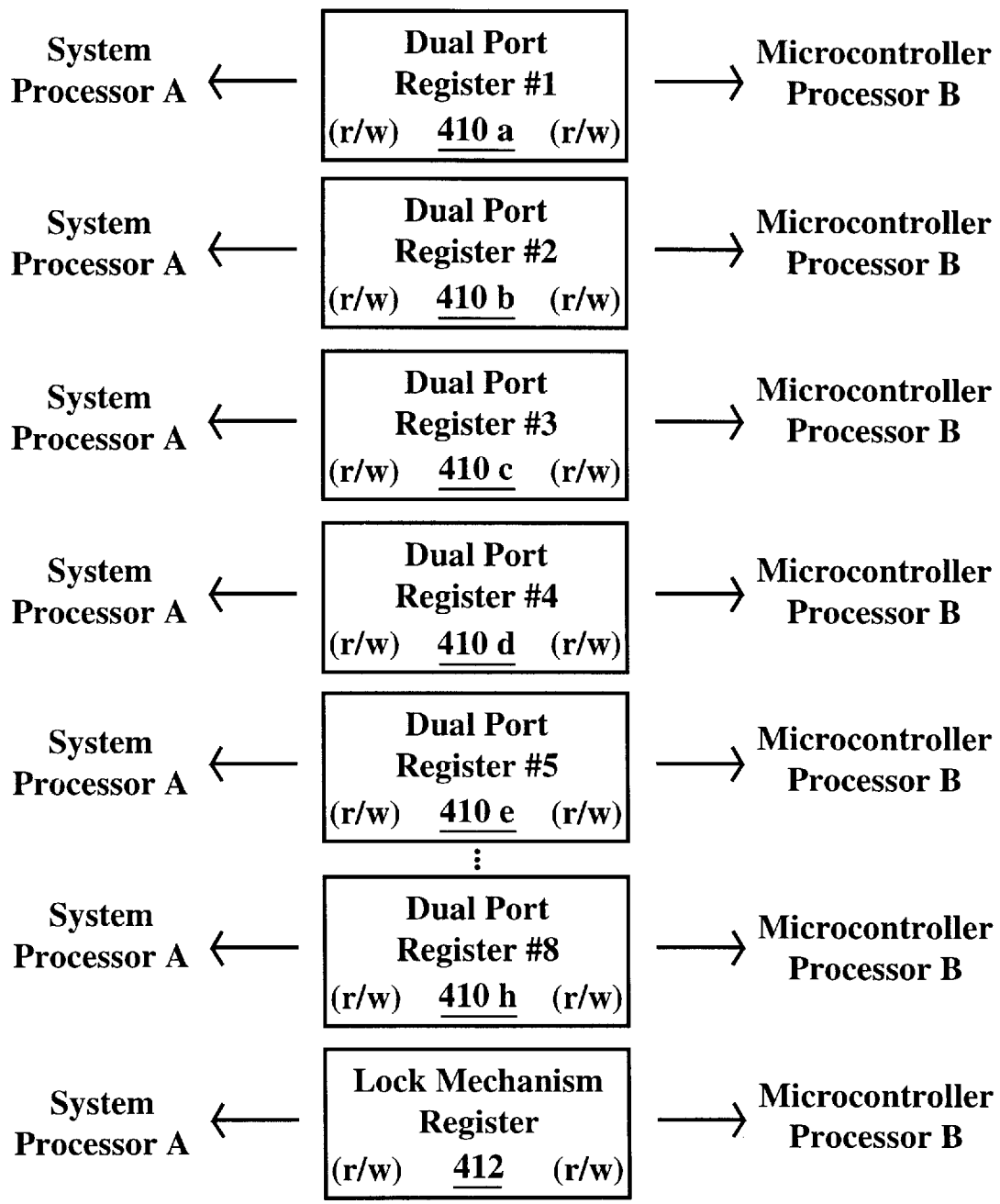
FIG. 5 is a detailed schematic diagram of the shared memory and contiguous traffic controller of the embodiment of FIG. 4 in accordance with the present claimed invention.

Referring next to FIG. 5, a more detailed schematic diagram of shared memory 410 and contiguous traffic controller 412 is shown. In the embodiment of FIG. 5, shared memory 410 is comprised of an eight register array of dual ported, eight bit, read/write registers shown as registers 410a–410h. Traffic controller 412 is shown as an additional register contiguous with registers 410a–410h. It will be understood that the present invention is also well suited to using various other quantities or types of registers in shared memory 410 and traffic controller 412. As indicated in FIG. 5, each of registers 410a–410h and 412 is coupled to system processor 400 and the processor of microcontroller 408, both of FIG. 4.

Referring still to FIG. 5, in the present embodiment, one of registers 410a–410h is used to interrupt the processor which does not currently control access to shared memory 410. In so doing, the controlling processor interrupts the non-controlling processor and directs that processor to retrieve an instruction or query command in shared memory 410.

Figure 6:
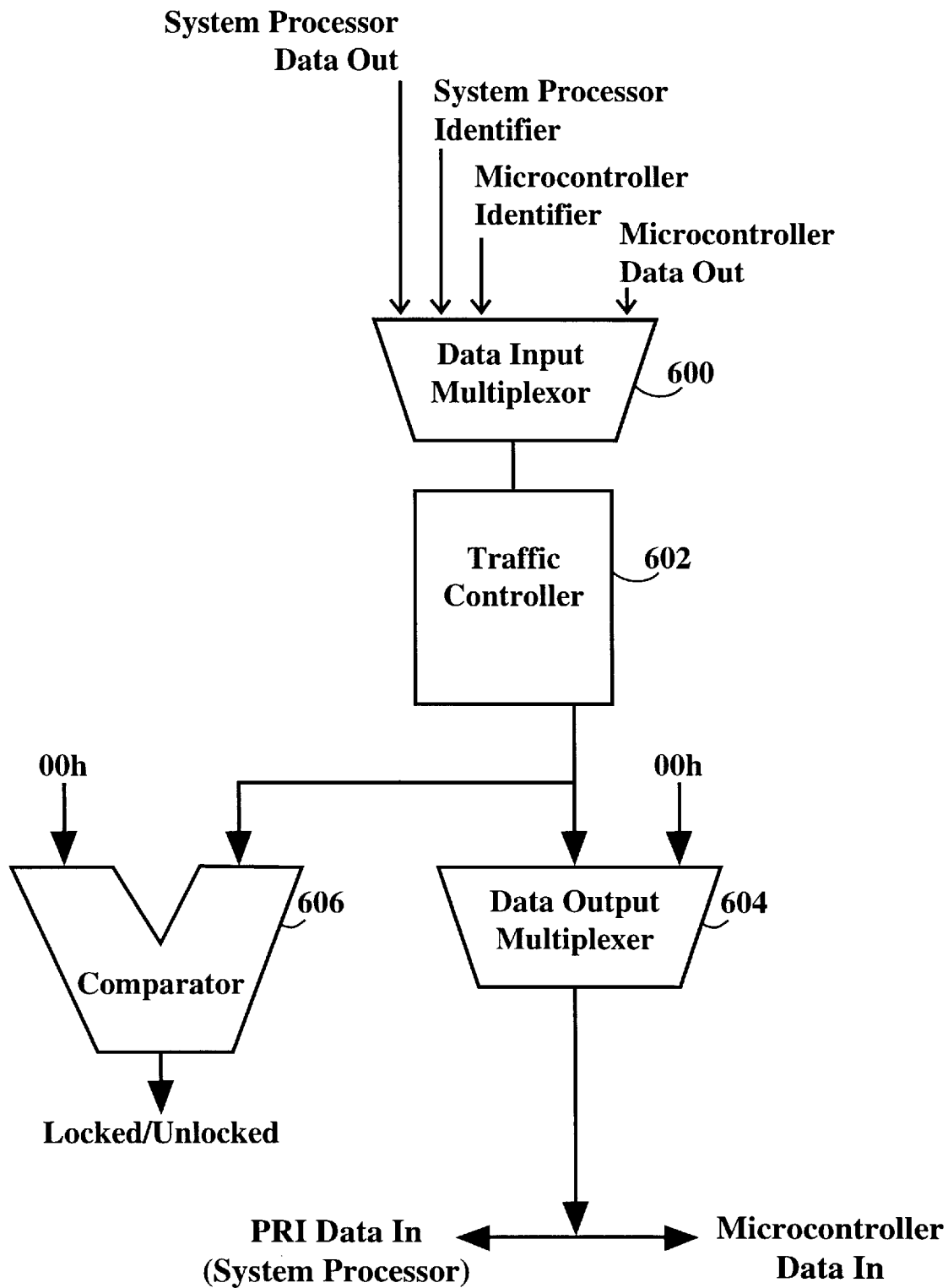
FIG. 6 is a detailed schematic diagram of the components comprising a traffic controller in accordance with the present claimed invention.

With reference now to FIG. 6, a detailed schematic diagram of the components comprising a traffic controller in accordance with the present invention is shown. In the embodiment of FIG. 6, a data input multiplexor 600 is coupled as shown to an output line, system processor data out, of system processor 400 and to an output line, microcontroller data out, of the processor of microcontroller 408, both of FIG. 4. The present embodiment is further adapted to have a system processor identifier and a microcontroller identifier received at data input multiplexor 600. The present embodiment also includes a traffic controller register array 602. The traffic controller of the present embodiment further includes a data output multiplexor 604 and a comparator 606.

Referring now to FIG. 6 and to FIG. 4, the traffic controller of the present embodiment operates as follows. The task of a processor which desires to control access to shared memory 410 (a task operating in either system processor 400 or the processor of microcontroller 408) reads the contents of traffic controller register array 602. If the contents of the traffic controller register array are zero, then the requesting processor's identifier is written into the traffic controller register array in a manner as described in step 304 of FIG. 3. In the present embodiment, the processor's identifier is written into traffic controller register array 602 via data input multiplexor 600. The determination as to whether the contents of the traffic controller register array are zero is accomplished using comparator 606. If the contents of the traffic controller register array are zero, that zero value is returned to the reading processor via data output multiplexor 604. If the contents of the traffic controller register array are not zero, the non-zero value is returned to the processor of the requesting task via data output multiplexor 604. When a non-zero value is returned to the reading processor, the requesting task periodically re-reads the contents of traffic controller register array 602 as described in steps 300 and 302 of FIG. 3. Once a zero value is returned to the requesting processor, the processor of the requesting task has its identifier written into traffic controller register array 602. Hence, as recited in steps 310 and 312 of FIG. 3, the processor of the requesting task maintains control of access to the shared memory until a zero is written to traffic controller register array 602.

The present invention is also well suited to incorporating synchronization devices into the architecture of FIG. 6. In so doing, even when the two processors operate on clocks of different frequency, the synchronization devices provide metastability for data passing across the inter-domain boundary.

Thus, the present invention provides a system which eliminates contention for memory shared between two processors; a system which allows either of two processors to control access to shared memory at a given time; and a system which achieves the above needs without requiring a complex operating system to control access of the two processors to the shared memory.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An apparatus for efficiently sharing memory between two processors in a peripheral component interconnect (PCI) environment comprising:

a first processor coupled to a PCI bus, a shared memory coupled to said PCI bus, a second processor coupled to said shared memory, a traffic controller coupled to said first processor and said second processor, said traffic controller adapted to indicate to said first and second processors when one of said first and second processors is controlling access to said shared memory such that the other of said first and second processors waits to attempt to control access to said shared memory thereby preventing contention between said first and second processors for control of said shared memory, said traffic controller configured such that when one of said first and second processors is controlling access to said shared memory, the other of said first and second processors can still access said shared memory if permitted by said one of said first and second processors controlling access to said shared memory.

2. The apparatus for efficiently sharing memory between two processors in a PCI environment as recited in claim 1 wherein said shared memory comprises:

at least one register.

3. The apparatus for efficiently sharing memory between two processors in a PCI environment as recited in claim 1 wherein said shared memory comprises:

an array of dual ported, eight bit, read and write registers.

4. The apparatus for efficiently sharing memory between two processors in a PCI environment as recited in claim 1 wherein said traffic controller comprises:

at least one register.

5. The apparatus for efficiently sharing memory between two processor in a PCI environment as recited in claim 1 wherein said traffic controller comprises:

at least one register adapted to store an identifier corresponding said first or second processors currently controlling access to said shared memory.

6. A method for preventing contention in a shared memory environment comprising the steps of:

a) having a first processor read a traffic controller coupled to a shared memory to determine whether said shared memory is available to be controlled by said first processor, b) writing an identifier corresponding to said first processor into said traffic controller provided said traffic controller does not have an identifier corresponding to said second processor stored therein, c) preventing said second processor from controlling said shared memory once said identifier corresponding to said first identifier is stored therein, d) allowing said second processor to access said shared memory even when access to said shared memory is controlled by said first processor if said first processor permits said second processor to access said shared memory; and e) removing said identifier corresponding to said first processor from said traffic controller when said first processor no longer desires control of said shared memory such that said shared memory is accessible and controlled by said second processor if desired.

7. The method for preventing contention in a shared memory environment as recited in claim 6 wherein step a) further comprises the step of:

having a first processor read a traffic controller coupled to at least one register to determine whether said at least one register is available to be controlled by said first processor.

8. The method for preventing contention in a shared memory environment as recited in claim 6 wherein step a) further comprises the step of:

having a first processor read a traffic controller coupled to an array of dual ported, eight bit, read and write registers to determine whether said having a first processor read a traffic controller coupled to at least one register to determine whether said an array of dual ported, eight bit, read and write registers are available to be controlled by said first processor.

9. The method for preventing contention in a shared memory environment as recited in claim 6 wherein step b) further comprises the step of:

waiting for a predetermined time period and then re-reading said traffic controller provided said traffic controller has an identifier corresponding to said second processor stored therein; and writing an identifier corresponding to said first processor into said traffic controller once said identifier corresponding to said second processor is no longer present within said traffic controller.

10. The method for preventing contention in a shared memory environment as recited in claim 6 wherein step b) further comprises the step of:

having a first processor re-read said traffic controller after said first processor has written said identifier corresponding to said first processor into said traffic controller thereby insuring that said identifier corresponding to said first processor is stored in said traffic controller.

11. A system for efficiently sharing a memory between two processors comprising:

a shared memory, a first processor coupled to said shared memory;

a second processor coupled to said shared memory;

a traffic controller coupled to said first processor and said second processor, said traffic controller adapted to indicate to said first and second processors when one of said first and second processors is controlling access to said shared memory such that the other of said first and second processors waits to attempt to control access to said shared memory thereby preventing contention between said first and second processors for control of said shared memory, said traffic controller configured such that when one of said first and second processors is controlling access to said shared memory, the other of said first and second processors can still access said shared memory if permitted by said one of said first and second processors controlling access to said shared memory.

12. The system for efficiently sharing memory between two processors as recited in claim 11 wherein said shared memory comprises:

at least one register.

13. The system for efficiently sharing memory between two processors as recited in claim 11 wherein said shared memory comprises: an array of dual ported, eight bit, read and write registers.

14. The system for efficiently sharing memory between two processors as recited in claim 11 wherein said traffic controller comprises:

at least one register.

15. The system for efficiently sharing memory between two processors as recited in claim 11 wherein said traffic controller comprises:

at least one register adapted to store an identifier corresponding said first or second processors currently controlling access to said shared memory.

* * * * *